Oct. 26, 1965
H. E. GRAHAM
3,214,321
PLASTIC STRUCTURAL MEMBER AND METHOD OF MAKING SAME
Filed Nov. 16, 1962
2 Sheets-Sheet 1
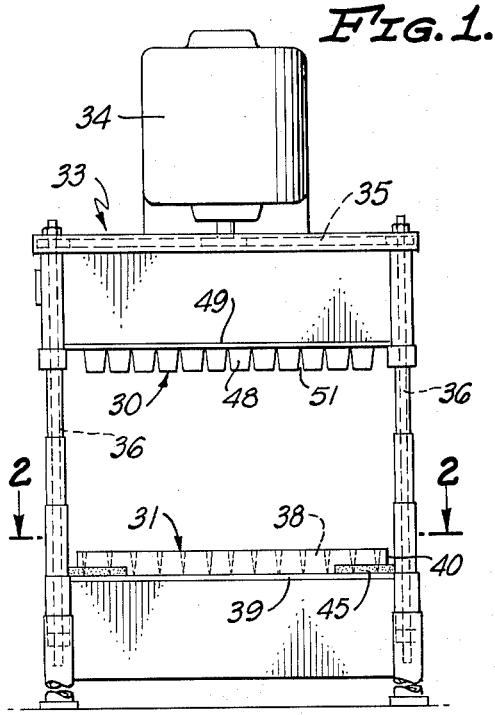
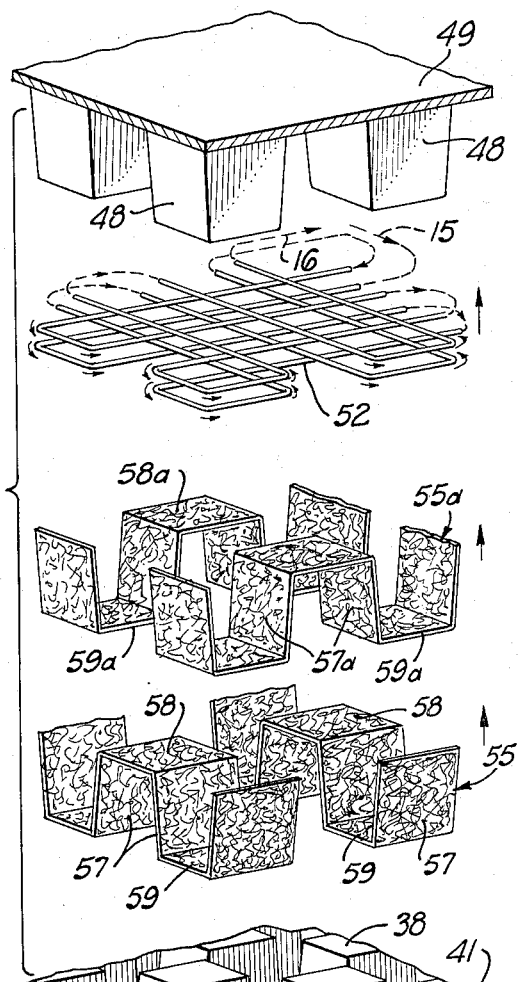
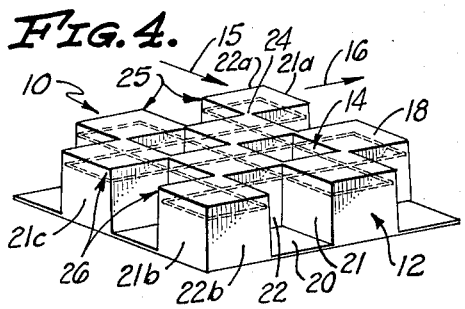
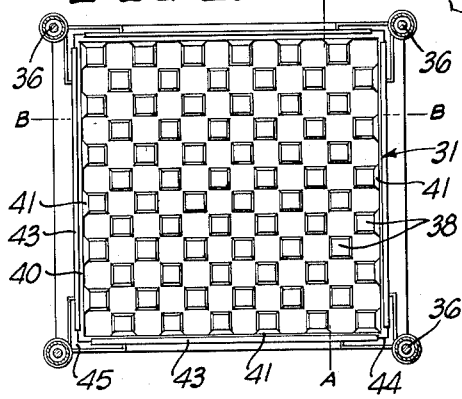
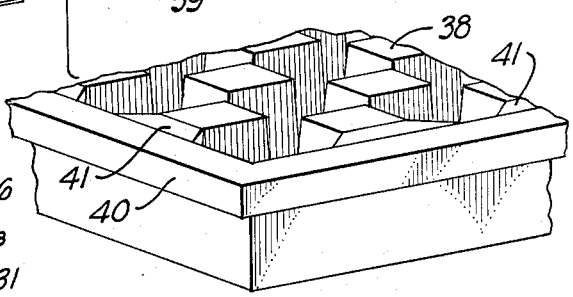
INVENTOR.
HAROLD E. GRAHAM Oct. 26, 1965  H. E. GRAHAM  3,214,321
PLASTIC STRUCTURAL MEMBER AND METHOD OF MAKING SAME
Filed Nov. 16, 1962  2 Sheets-Sheet 2
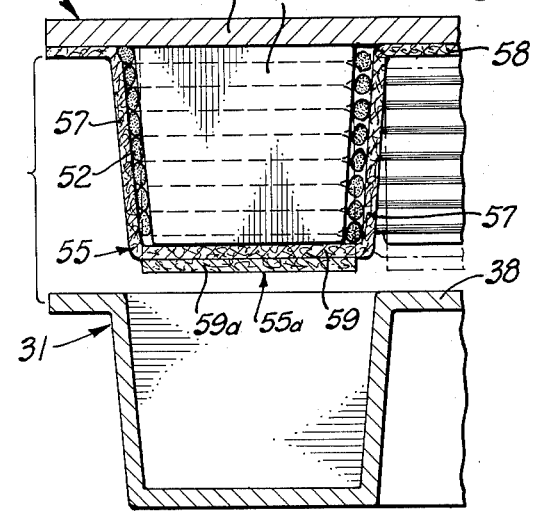
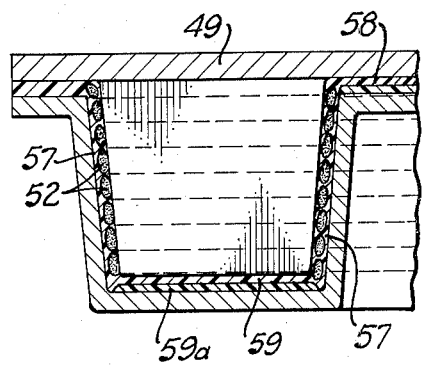
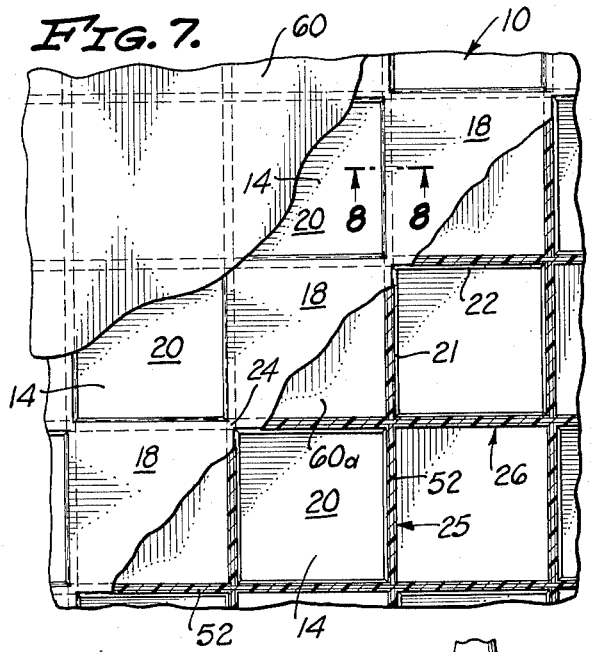
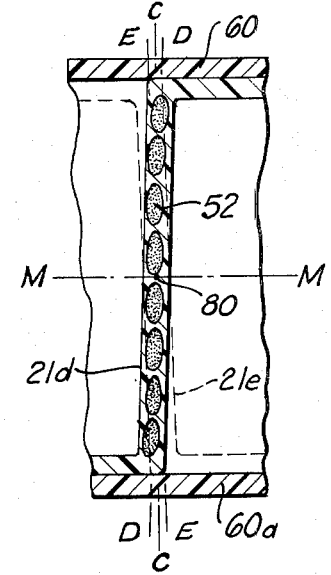
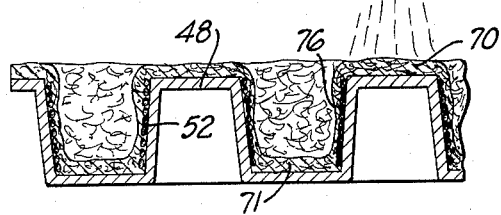
INVENTOR.
HAROLD E. GRAHAM

United States Patent Office 3,214,321
Patented Oct. 26, 1965

3,214,321
PLASTIC STRUCTURAL MEMBER AND METHOD
OF MAKING SAME
Harold E. Graham, 505 Baughman, Claremont, Calif.
Filed Nov. 16, 1962, Ser. No. 238,189
14 Claims. (Cl. 161—131)

This invention relates to a high-strength structural member, useful as an article of manufacture or as a core of a laminated structure, having a pattern of crossing rows of walls producing a pattern of cavities therebetween; also to a method of making such a structural member.

In my earlier application entitled Hollow Plastic Structure and Method, Serial No. 799,895, filed March 17, 1959, there is disclosed a core member for a laminated structure which, when viewed from either face, appears as a pattern of hollow cubes joined corner-to-corner in a checkerboard pattern with a similar pattern of cubical cavities therebetween, the interior of each hollow cube being closed at its top by a top wall and the bottom of the intervening cavities being closed by corresponding bottom walls. Here and throughout the present application such a three dimensional member and similar members will be referred to, for purpose of simplicity, as if viewed from one face and thus having top walls closing the hollow interiors of projections and bottom walls closing the bottoms of intervening cavities, even though the top walls become the bottom walls and vice versa if the member is viewed from the opposite face where a similar pattern of projections and cavities will appear. In the prior structure the side walls of the cubes in adjacent rows are in alignment and molded integrally with each other. The entire core element was formed of molded plastic material and all walls thereof were reinforced by glass fibers.

In my prior structure the glass fibers were incorporated into the top, bottom and side walls in one operation by closing appropriately mated dies on a thick loose mass of randomly arranged glass fibers while a pool of plastic material in relatively liquid form was on the lower die, the closing of the dies deforming and compressing the glass-fiber mass to the desired shape and spreading the plastic therethrough, the molded core member being polymerized while in the mold. The resulting core members were of high strength and have been very successfully used as the cores of structural panels, comprising plastic skin members adhered to the top and bottom walls on the opposite faces of the core member, in the construction of boat hulls, structural panels and the like. The present invention is an improvement thereon, albeit not limited to the aforesaid shapes and designs, and can very substantially increase the strength of the core member alone or any structural panel of which it is a part. The present invention makes possible heretofore unknown strengths in cellular or grid-like structures made of plastic material.

The above-described prior practice produced a core member of lesser strength primarily because the glass fibers in the side walls of the cavities or cubes were necessarily the result of displacement of some of the fibers of the thick loose mass from the horizontal plane thereof into the upright planes of the side walls. Stated in other words, the glass fibers in a rather localized zone, near where two die faces molding opposite sides of a side wall will lap, must be relied upon to supply the glass fibers for the side wall and these fibers must slip relative to each other to permit the displacement needed to have them appear in the side wall. With the prior structure the maximum amount of glass in the side walls was of the order of about 10–15% by weight. It is an object of the present invention to produce side walls containing a much greater amount of glass, usually about 25–50% or more by weight based on the finished side walls. This increase in glass content alone makes the side walls and the entire plastic member much stronger.

With the older process the number of glass fibers joining the diagonally adjacent cubical projections or the integral aligned side walls of the cubical projections in adjacent rows was also limited. It is an object of the present invention to greatly increase the glass fibers in junction zones where side walls or wall segments of the same or intesecting rows meet.

The present invention makes possible the use of continuous reinforcing elements in the side walls of a pattern of cavities—reinforcing elements of such length as to extend continuously from side to side of the structural member. It is an object of the invention to provide a structural member having a grid of crossing walls each formed of wall segments joined integrally at their ends in junction zones whereby each wall extends continuously from side to side of the structural member throughout at least a part of its height, the wall segments of intersecting longitudinal and transverse walls being integral at such junction zones. It is another object of the invention to provide a plurality of reinforcing elements arranged one above the other in stacked or superimposed relation within the continuous portion of each wall, extending between pairs of opposed sides of the structural member. Here and elsewhere I refer to longitudinal walls or rows as extending in parallel relation between one pair of opposed sides of the structural member and to transverse walls or rows as extending in parallel relation between another pair of opposed sides of such member in crossing relation with the longitudinal walls or rows, even though one side is common to both pairs, all without limitation to a four-sided structural member or to a crossing which is at right angles. The invention comprehends structural members with such number of sides, three or more, as will provide the aforesaid walls extending continuously thereacross to form cavities that are polygonal in shape and have three of more sides each formed by a wall segment of such walls.

It is a further object of the invention to have the superimposed reinforcing elements in intersecting walls cross each other in alternating stacked relation, with the stacked reinforcing elements in one such intersecting wall extending between the superimposed runs in the other of such intersecting walls, all in the nature of rails of a split rail fence.

In the preferred practice of the invention the runs of reinforcing elements at the same level in adjacent parallel walls may be formed of a single length of the elongated reinforcing-element material extending to-and-fro along longitudinal rows of walls through endmost wall segments connecting such walls at the sides of the structural member. Additionally, such a single length of elongated material, alone or as a continuation of the aforesaid length, may be used likewise to form the runs in the transverse walls at a slightly higher level. It is even possible and often preferable to form all the successive runs in the longitudinal and transverse rows at successively higher levels of the same length of the elongated material. It is an object of the invention to provide a structural member in which the runs are integrated in any of the manners just described. A further object is to provide unique winding patterns accomplishing these objectives.

A further object of the invention is to provide additional reinforcement for the side walls of the cavities through the use of additional reinforcing elements traversing the runs of stacked reinforcing elements therein.

The novel features of the invention have thus far been described with reference to cavities open at their tops and bottoms to the top and bottom faces of the structural member. In the formation of laminated structural panels such a structural member may be covered on one or both faces by a skin member adhered to the longitudinal and transverse walls which then reinforce the skin member or members. Such a structure is within the objectives of the invention. However for many purposes, including the provision of extensive bonding areas between the skin member and the wall-formed structural member, I prefer to close at least partially alternate cavities at the tops and/or the bottoms thereof. In the preferred practice the tops of alternate cavities in any row are at least partially closed by top walls and the remaining cavities are at least partially closed at their bottoms by bottom walls. It is an object of the invention to provide the aforesaid longitudinal and transverse walls reinforced by continuous reinforcing elements and to mold the top or bottom walls of such cavities integrally with the top portions and bottom portions of the wall segments bounding same.

Another object of the invention is to reinforce such top and bottom walls by internal reinforcements separate from the stacked reinforcing elements of the crossing rows but preferably cooperating therewith as the aforesaid additional reinforcing elements for the side walls of the cavities. In the preferred practice of the invention it is an object to provide a unique double reinforcement for each side wall, top wall and bottom wall. In this connection it is an object to dispose zig-zag strips of reinforcing material of cavity width in the cavities of crossing rows with the strips crossing each other in the bottom and top walls and having upright portions traversing the stacked runs of reinforcing elements in the side walls of the cavities. The invention also contemplates alternative ways of providing such additional side wall reinforcement.

Structural elements of the type described can be formed of various materials. Particular advantages arise from forming the intersecting walls of molded plastic material, typically of resin, e.g. polyester resins, epoxy resins, silicone resins, phenolic resins, etc., and to provide internal glass fiber reinforcement therefor. In this connection the reinforcing elements extending from side to side of the structural member are preferably made of glass roving. Likewise the reinforcement for the top walls and the bottom walls and the aforesaid additional reinforcement of the side walls is preferably by way of glass fibers encapsulated in such walls in manners to be described. It is an object of the invention to provide a plastic structural member reinforced by glass fibers in such ways; also to provide a laminated structure employing one or more of such plastic structural members and one or more skin members adhered thereto and formed of plastic, metal or other material.

Other objects of the invention reside in novel methods of making the aforesaid structural members and laminated structures employing them. These include unique methods of winding the reinforcing elements in one or more levels to form the desired three-dimensional grid and novel methods of protecting the stacked reinforcing elements during molding of the encapsulating walls.

Still further objects and advantages of the invention will be apparent to those skilled in the art from the following description of exemplary embodiments.

Referring to the drawings:

FIG. 1 is a side elevational view of a machine capable of molding the structural member of the invention;

FIG. 2 is a cross-sectional view taken along the line 2—2 of FIG. 1, showing the pattern of the lower die;

FIG. 3 is an exploded view showing elements of the structural member and their relation to each other and to the die;

FIG. 4 is a perspective view of a small embodiment of the invention;

FIG. 5 shows fragments of the dies preparatory to closing and with the reinforcing elements assembled in one particularly desirable arrangement;

FIG. 6 shows the die fragments of FIG. 4 when closed;

FIG. 7 is a top view of a fragment of a laminated panel of the invention, broken away at various levels to show the internal construction;

FIG. 8 is an enlarged fragmentary sectional view taken along the line 8—8 of FIG. 7; and FIG. 9 illustrates diagrammatically an alternative way of applying the additional or supplemental reinforcement preparatory to molding.

Referring first to FIG. 4 there is here exemplified a small structural member 10 of a cubical pattern similar to that shown in my application, supra. For purpose of simplification it is shown much smaller than in practice but will exemplify the cubical pattern and the winding pattern. The structural member here and elsewhere exemplified in the drawings can be considered as a plurality of substantially cubical projections 12 joined corner to corner in a checkerboard pattern with substantially cubical cavities 14 therebetween. For purpose of explanation it is convenient to consider the projections as arranged in longitudinal rows, considered in the direction of the arrow 15, and transverse rows, considered in the direction of the arrow 16, here at right angles to each other. Alternate cavities 14 in any row are closed by top walls 18 which form the top walls of the projections 12. The hollow interiors of such projections form the cavities on the other face of the structural member 10. Likewise the bottoms of the remaining cavities of any row are closed by bottom walls 20 and form the tops of projections when the structural member is viewed from its other face.

The cavities are bounded throughout their heights by longitudinal wall segments 21 and transverse wall segments 22 arranged in corresponding rows. The ends of adjacent wall segments in any row are molded integrally end to end in upright junction zones 24 (see FIGS. 4 and 7). Thus the longitudinal wall segments 21 in each longitudinal row form compositely a longitudinal wall 25 extending continuously between corresponding sides of the structural member 10. Likewise the transverse wall segments 22 in each transverse row form compositely a transverse wall 26 extending continuously between its corresponding sides of the member 10. The ends of the transverse wall segments 22 are molded integrally with each other and with the ends of the longitional wall segments 21 in the upright junction zones 24. Each of the latter thus provides the meeting point of two longitudinal and two transverse wall segments in the pattern disclosed.

With such pattern, in which alternates cavities are closed by top walls 18 and the remaining cavities by bottom walls 20, the sidemost rows on all sides of the member 10 will be irregular in the sense the endmost or last cavity of any row will be respectively closed and open on opposite sides of the member 10. This is true if, as is desirable in this pattern, there is an even (although not necessarily equal) number of cavities along each side of the member. For example the projection (or the cornermost underneath cavity) at the rearmost corner of the member as viewed in FIG. 4 is closed by an endmost longitudinal wall segment 22a and an endmost transverse wall segment 21a. Considering either longitudinal or transverse rows, the next cavity is open sidewardly and the next is closed by an endmost wall segment, the sequence continuing in this manner to the last or corner cavity which is open on two of its sides. Along any side of the member 10 alternate cavities are thus sidewardly closed by endmost wall segments and the remaining cavities are sidewardly open. Cavities open sidewardly on two of the sides thereof are thus formed at diagonally opposite corners of the member 10 as suggested at the extreme right and left of FIG. 4. The cavities at the remaining diagonally-opposite corners are sidewardly closed, e.g. at the rearmost corner of FIG. 4 by the aforesaid endmost wall segments 21a and 22a and the foreground corner by endmost wall segments 21b and 22b.

The plastic structural member 10 thus far described can be molded between upper and lower dies 30 and 31 of a molding machine 33, suggested in FIGS. 1 and 2, which provides a motor 34 connected by a chain 35 to sprockets on four threaded shafts 36 at the corners, these shafts serving to close the interdie space by lowering the upper die into mating relation with the lower die.

The lower die 31 comprises a plurality of protrusions 38 arranged corner to corner and extending upward from a base member 39 on which they are mounted or of which they form a part. Such protrusions are arranged in longitudinal rows, parallel to the line A—A of FIG. 2, and transverse rows, parallel to the line B—B, forming a checkerboard pattern of protrusions and intervening cavities. The corners of the diagonally opposite protrusions are separated by small spaces which will aid in molding the junction zones 24.

Each protrusion 38 is substantially cubical, deviating from an exact cubical form only because of the small draft needed to pull the molded member from the die. This draft angle is greatly exaggerated in the drawings for purpose of clarity and will ordinarily be in the range of about 1–5° for the thin-wall molded structural member 10 that is preferred. Considering a vertical plane through the line A—A, the slightly sloping side walls of adjacent protrusions will deviate oppositely from such vertical plane because of the draft angle. The bottoms of such side walls of adjacent protrusions may meet in a straight line in such vertical plane or may be slightly offset therefrom or even slightly overlap same. For purpose of later reference, the side walls of the protrusions of two adjacent rows face such a vertical plane oppositely and can be considered as forming what may be termed a V-shaped channel that is bounded along its length by the alternating side walls of the protrusions in the adjacent rows, the V-angle of such a channel being twice the draft angle. The same relationships hold for a vertical plane through the line B—B as concerns the side walls of the transverse rows of protrusions.

The lower die 31 is desirably surrounded on each of its four sides by a frame 40 rising substantially to the height of the tops of the protrusions 38. Fillers 41 at opposite ends of adjacent rows bridge the space from the endmost protrusions to the inner wall of this frame and produce the open-side cavities of the structural member. The inner wall of this frame molds the outer faces of the endmost wall segments, e.g., those previously designated by the numerals 21a, 21b, 22a and 22b. Deformable dam members 43 (FIG. 2) may extend along each side of the frame 40 with their ends spaced to form corner passages 44 for escape of excess plastic into collecting troughs 45. These dam members are compressed and to some extent flattened by the upper die when closed, forming a seal between the dies at the sides and guiding the plastic to the corners of the interdie space.

The upper die 30 is similarly formed except that it has no frame 40, dam members 43 or fillers 41. Its protrusions 48 are also substantially cubical with the aforesaid draft and extend from or are integral with a base member 49. They are arranged in a corresponding checkerboard pattern to extend into the cavities of the lower die. The tops of the protrusions of one die stop short of the bottoms of the cavities of the other die when the dies are closed, providing a molding space in which the top and bottom walls 18, 20 are molded, the clearance determining the wall thickness of these walls. The cavity-separating wall segments 21, 22 of the member 10 are of substantially uniform thickness throughout their heights and are molded between parallel side walls of the internested protrusions of the closed dies. Such side walls on the upper die can be considered as forming V-shaped channels 51, as previously described with reference to the lower die, but in the absence of the frame 40 these channels will be open at their ends.

The protrusions of both dies can be solid or hollow. The latter is preferable when the dies are to be heated, as when employing a thermosetting resin that is to be polymerized between heated dies. Ordinarily the die faces will be coated with polytetrafluoroethylene or a thin coating of similar plastic to prevent adhesion of the resin to the die surfaces.

With this background the preferred wall reinforcements can be described as follows. A single long length of glass roving, e.g. a 60-end roving comprising this number of side-by-side glass filaments, may be wound on the side walls of the protrusions 48 of the upper die 30 to form the three-dimensional reinforcing grid and all of the stacked or superimposed reinforcing elements 52 that are to appear in the longitudinal and transverse walls. This is preferably done when the upper die 30 is removed from the machine 33 and upturned on a flat surface with its protrusions 48 extending upwardly. The winding pattern will be described as performed manually but it is apparent that the winding of such a glass roving or similar member can be accomplished by suitable winding equipment.

The winding pattern will be evident from FIGS. 3 and 4. Starting at one corner of the structural member 10 the roving will extend in the direction of the arrow 15 along the die face which is to mold the endmost wall segment 21a on one side of the structural member 10. Its later winding positions can best be described with reference to the walls and endmost wall segments of the finished structural member, see FIG. 4. Thus it extends forwardly along the first complete transverse wall 26, turns to extend through the endmost wall segment 21c, thence rearwardly or reversely through the next transverse wall, through the endmost wall segment on the opposite side of the structural member 10 joining such transverse wall with the next-beyond transverse wall, and thus back and forth until it reaches and extends through the endmost wall segment 21b at the diagonally opposite corner of the member 10. This completes the reinforcing elements at one level in the transverse walls. The roving then traverses the endmost wall segment 22b on the near side of the member 10 as viewed in FIG. 4 and then extends through the first longitudinal wall 25, rising minutely to cross the rovings in the transverse walls 26. From this first longitudinal wall the roving turns through the endmost wall segment on the far side of the member 10 that joins the first and second longitudinal walls. It returns oppositely in the second longitudinal wall and turns through the endmost wall segment joining it to the next-beyond longitudinal wall, and thus back and forth until it traverses the endmost wall segment 22a in the direction of the arrow 16. This completes the reinforcing elements at the slightly higher level in the longitudinal walls. The same winding patterns can be repeated at progressively higher levels to form the remaining reinforcing elements in the transverse and longitudinal rows of walls. If such successive windings are formed on the upper die 31 the various runs of the roving will directly contact the side faces of the protrusions 48 and will lie in the V-shaped channels 51.

The runs at the different levels may be spaced so that the roving at the cross-over points remain spaced from the rovings of the crossed series. However I prefer to compact together the rovings of the crossing rows at the cross-over points. While the roving in the various runs is of uniform height and uniform width between cross-over points the localized compaction there results in a lesser height and greater width in the cross-over zones, which will ultimately be the junction zones 24 of the finished member 10. As a practical matter this compaction can be effected by forcing the edge of a metal or other strip into the V-shaped channel 51 after each run is in place or after several runs have been laid. There is some springback due to the resiliency or softness of the roving but the friction with adjacent side-wall faces of the protrusions 48 will tend to maintain some compaction. The successive runs of any longitudinal or transverse row are likewise brought closer to the lower runs in such wall by such strip insertion.

To hold the thus-formed grid in place when the die 30 is upturned and to protect the superimposed runs of rovings as the dies close, it is desirable to employ additional reinforcing elements which extend at least partially across such superimposed runs. Such additional reinforcing elements can be made to serve also as reinforcements of the top and bottom walls 18 and 20 of the member 10. Protection of the superimposed runs during closing of the dies is of particular importance if the wall segments 21 and 22 are to be thin, as is desirable in the preferred form of the invention.

In the preferred practice the additional reinforcing elements are in the form of crossing rows of zig-zag strips of reinforcing material of substantially cavity width, as best shown in FIG. 3 which illustrates longitudinal strips 55 and transverse strips 55a. Each strip is preferably preformed in zig-zag shape. By way of illustration each longitudinal strip 55 has upright portions 57 that will traverse the stacked runs of the glass roving on respective side faces of the protrustions of a transverse row when the strip is inserted into the cavities of the wound upper die. These upright portions 57 are joined in zig-zag fashion by portions 58, which will traverse the bottoms of the cavities of the upper die 30 when inserted in such die, and portions 59, which will traverse the tops of the protrusions 48 of such die when thus inserted. The transverse strips 55a have respectively corresponding upright portions 57a and portions 58a and 59a. The strips 55 and 55a may be pressed into the cavities of the die 30 in any order. When inserted they will cover and protect the superimposed runs of rovings on all sides of any die cavity, see FIGS. 5 and 6. In the finished member 10 the upright portions 57, 57a provide the additional reinforcement of the wall segments 21 and 22. The crossing portions 58, 58a appear in and provide a double reinforcement for the top walls 18. The crossing portions 59, 59a similarly appear in and provide a double reinforcement for the bottom walls 20 of the finished member 10.

The strips 55, 55a in the preferred embodiment may be strips of glass mat, strips of glass cloth (preferably cut straight rather than on the bias), or strips of other glass-fiber or glass-fiber-containing material. They are preferably strips of unidirectional glass mat, comprising a plurality of rovings loosely held together as by transverse fibers or flaring fiber ends and sometimes by an adhesive compatible with the resin to be employed in making the member 10.

All such strips are preferably preformed into a zig-zag shape simulating the shape they will ultimately assume when in the cavities of the die 30. The upright portions may initially diverge from the vertical by an angle more than the draft angle of the die, making each strip somewhat longer than the row of die cavities it is to occupy. The strip may then be longitudinally compressed either as a whole or in progressive sections to bring the upright portions to or beyond vertical positions, in which form they can be inserted into the die cavities without displacing the runs of superimposed rovings. When released, the strip will expand enough to press the upright portions against the superimposed rovings and hold the strip and the rovings in place when the die is inverted. Any of the aforesaid glass fiber strips can be preformed by heating them and winding them to-and-fro around upright pegs or deforming them between toothed rolls.

The die 30 can now again be positioned in the molding machine 33, see FIGS. 5 and 6, and a pool of the liquid resin placed on the lower die 31 near its center. The dies are now closed, see FIG. 6, the protrusions 48 of the upper die and their retained stacked rovings and transverse strips entering the cavities of the lower die 31. This closing action will spread the plastic throughout the inter-die space to encapsulate the aforesaid reinforcing elements and form molded-surface walls throughout the member 10. The dam members 43 will guide the plastic to the corners and will discharge any excess through the corner passages 44. The closing of the dies will also press the upright portions 57, 57a of the strips against the stacked runs of rovings to compact the latter against the die faces and in some instances expand them vertically to bring the adjacent runs closer together or substantially into contact. The upright portions 57, 57a of the strips present smooth surfaces to the side walls of the protrusions of the lower die to slide therealong without disturbing the underlying runs of rovings. The crossing portions 58, 58a and 59, 59a of the zig-zag strips are compressed and encapsulated between the top surfaces of the protrusions of one die and the bottom surfaces of the cavities of the other, the ultimate thickness of the resulting walls 18, 20 being determined by the spacing of such surfaces.

The dies may remain closed until the structural member 10 becomes sufficiently hardened to be removed. With heated dies polymerization of the resin may be substantially complete when the member 10 is removed or it may be removed in a green state in which substantial pressure applied to it can deform it slightly from its planar form to conform to the broad curves of a boat hull or other structure. Likewise with a cold-cure resin or other plastic the member 10 can be withdrawn while in condition to be thus deformed, the cure or set being later obtained in the desired form by the lapse of time or the application of heat.

The resulting structural member 10 can be used as such or can be used as the core of a laminated structure. A skin member 60 (FIGS. 7 and 8) can be adhered to one or both faces of the member 10 or similar members disposed edge to edge. The top walls 18 compositely present an adhesion area equal substantially to one-half the area of the entire member 10, as do the bottom walls 20, giving exceptional bonding strength and rigidity to the resulting laminated structure.

FIG. 9 suggests an alternate way of providing the additional reinforcement or reinforcing elements for the top and bottom walls 18 and 20 and for protecting the superimposed runs during closing of the dies. Here the runs of roving are applied to the upturned upper die 30 as before. Instead of or in addition to the use of the strips 55, 55a a loose mass of glass fibers is first deposited on the wound die, forming cover masses 70 for the tops of the die protrusions 48 and cover masses 71 for the bottoms of the intervening cavities. The individual glass fibers, cut to desired length, may be projected from a suitable nozzle 74 and deposited to form these masses. This can be done by known equipment and the nozzle 74 swept across the die to build the cover masses to the desired height. Some of the fibers will spill over onto the side walls of the protrusions 48 in covering relation with at least some of the superimposed runs of roving wound thereon. This action is desirable as protecting the latter during closing of the dies, similar to the action of the strips 55, 55a.

The side deposit or spill-over, indicated by the numeral 76, can be accentuated by inclining the nozzle 74 toward the various side walls during deposit of the cover masses 70 and 71. The action can be further accentuated by expelling from the nozzle 74 a mixture of glass fibers of different lengths, as is very desirable. The longest fibers may well be of a length substantially equal to the diagonals of the upper faces of the projections 48 with other fibers shorter, e.g. some about two-thirds and some about half the length of the longer fibers, the shorter lengths being present in greater number. The objective of such side deposits is to have at least some glass fibers traversing the uppermost and/or lowermost runs of superimposed rovings to prevent their displacement in the small interdie spaces when the dies are closed. Those glass fibers which are vertical or inclined will be particularly useful in preventing such displacement. Preferably all of the superimposed runs will be covered to some extent. The spill-over fibers 76 will appear in the finished member 10 as an additional or double reinforcement within the endmost wall segments and those wall segments inwardly thereof throughout the pattern. The fibers in the cover masses 70 and 71 will be compressed and will appear as reinforcements for the walls 18 and 20 of the member 10.

It is also possible to build up on a substantially flat surface a loose thick mass of individual glass fibers randomly arranged and to slide such mass from this or another surface onto the upturned die 30. Such forming and transfer is disclosed more completely in my application supra. The loose thick mass can be built up by sweeps of the nozzle 74 and a mixture of multiple-length fibers is here particularly desirable, preferably with the number of shorter fibers greatly exceeding the longer ones. The thick mass can be preliminarily compressed and deformed into the cavities of the die by a supplemental die with smaller protrusions formed with steeper draft angles, as disclosed in such application. The supplemental die can then be removed and the main dies closed to complete the deformation and compaction of the loose mass of fibers. This procedure can also be used to make the core members of the aforesaid application or to cover and provide the additional reinforcement for the superimposed runs of the grid already on the mold.

It should be understood that the three-dimensional grid of crossing reinforcing elements can be formed on the lower die 31 rather than on the inverted upper die. This is particularly true if the reinforcing elements are separate or if the fillers 41 and the frame 40 are removed from the lower die to permit the continuous winding pattern previously described.

It should also be apparent that such a three-dimensional grid of crossing reinforcing elements can be wound or built up on some other structure, being then removed therefrom and placed in the V-shaped channels of the upper or lower dies 30 and 31. For example, it is possible to wind a single length of the elongated reinforcing material about upright pegs disposed in the pattern of the ends of the desired longitudinal and transverse rows of walls. The runs should desirably be secured together, at least at the cross-over points sufficiently to permit the grid to be lifted from the pegs or other winding form or guide for transfer to the V-shaped channels of one of the molding dies. When using glass roving in this way a preform grid can be produced, the runs being adhered sufficiently to permit such transfer. For example, the roving can be freshly impregnated or coated with an adhesive in emulsion, powder or straight liquid form, the grid built to the desired height in the aforesaid winding patterns, the winding form and the wound roving being then heated to set the adhesive and produce a removable preformed grid which can be transferred to one of the molding dies. Such a grid alone may be used to reinforce the wall segments or supplemental reinforcement may be supplied through use of the arrangements previously described, which can be superimposed on the runs of such a grid.

It should likewise be understood that the invention is not limited to cavities that are alternately closed at opposite ends by the walls 18 and 20. In some molded structural members it is desirable to use a pattern of open-ended cavities, similar to those formed between crossing rows of partition walls in an egg crate. Such a pattern of crossing walls with all cavities open at both ends can be produced by the dies previously disclosed if they are brought together close enough to squeeze all of the plastic from between the tops of the protrusions on one die and the bottoms of the cavities of the other die. Other dies of the injection-molding or movable-die type can also be used. In all such instances the superimposed runs of roving or other reinforcing elements will extend along each of the crossing walls continuously from side to side of the structual member. The supplemental reinforcement of the wall segments is usually omitted in this embodiment of the invention but can sometimes be supplied by using the deposited-fiber techniques previously described. With a preform grid it is usually not necessary to protect the runs by transverse fibers but these can be sprayed directly on the preform grid to provide additional reinforcement of the ultimate wall segment if desired.

Structural members in which all internal wall cavities are open at opposite ends and in which the crossing walls are reinforced by superimposed reinforcing elements crossing in the junction zones and extending continuously from side to side of the member are structures of high strength. They can be used as curtain walls, room dividers, grids, cores or reinforcing members for a skin member or members laminated thereto or therebetween, etc. They are particularly strong in resisting bending and also in supporting loads applied in other directions. They are extremely resistant to twisting forces and have high impact and shear strength.

The height of the continuous portion of each wall through which the superimposed runs extend, which portions are continuous between opposed sides of the structural member, will depend upon two factors. First, such height will depend upon the small angle that successive wall segments of any longitudinal or transverse wall deviate in opposite directions from the vertical median central plane of the wall, indicated by the line C—C of FIG. 8. Second, such height will be determined by the wall thickness of the wall segments 21, 22. The relationships can be further explained by reference to FIGS. 7 and 8.

In FIG. 7 the top skin member 60 of a structural panel embodying the invention is broken away, first, to show the top walls 18 of the substantially cubical projections of the member 10, the cavities 14 and their bottom walls 20, and, second, to the horizontal midplane M—M of the core member 10 show the wall segments 21, 22 of the longitudinal and transverse walls 25, 26 and a portion of the bottom skin member 60a now exposed because of cutting away portions of the top walls 18. The additional reinforcements, formed by the zig-zag members 55, 55a or the deposited fibers of FIG. 9, are omitted in FIGS. 7 and 8 for clarity of illustration.

In the enlarged section of FIG. 8 the particular wall segment 21d (shown in full lines) has a central midplane D—D that is displaced slightly clockwise from the upright median plane C—C. The next-beyond wall segment 21e of the next cavity (shown in dotted lines) has a central midplane E—E that is displaced slightly counterclockwise from the median plane C—C. The planes C—C, D—D and E—E intersect in a line 80 lying in the horizontal midplane M—M. The wall segments 21d and 21e of successive cavities form an X pattern with relation to the line 80.

In the preferred embodiment of FIG. 8 each wall segment is of such thickness that the vertical plane C—C lies therewithin at all positions from top to bottom of the wall segment. Stated in other words, while this provides top edges of adjacent wall segments that are staggered with reference to the vertical median plane C—C of a wall (and similar bottom edges that are correspondingly staggered), the degree of staggering is not such as to laterally separate such edges from each other at the top or bottom of the member 10. The successive wall segments and the wall formed thereby thus have continuous portions of a height equal to the height of such wall segments and such wall. The reinforcing elements 52, here shown in somewhat flattened sections, can thus be stacked or superimposed throughout the height of the wall segments and the wall formed thereby. With wall segments of a height of about 1", a thickness of about $\frac{1}{16}$" and a die draft angle of about 2½° the above relationships will hold. The same is true if the thickness of the wall segments is increased with or without an increase in the draft angle.

With a larger angle between the planes D—D and E—E, resulting from larger draft angles, and with no increase in thickness of the wall segments, the vertical median plane C—C will lie within the wall segments through only a portion of their height and the superimposed reinforcing elements 52 will be localized in such portion. The excess staggering of the top or bottom walls of the wall segments may create saddles or discontinuities at the tops and bottoms of the longitudinal and transverse walls at the junction zones 24, which will then be of a height less than the height of the wall segments. As the grid of reinforcing elements will thus be of lesser height, the strength of the longitudinal and transverse walls 25 and 26 will be somewhat less unless larger reinforcing elements or rovings are used with or without thicker wall segments. However structures as described in this paragraph are entirely satisfactory for many uses of the invention and are included in the scope thereof.

If desired the structural member 10 can be made quite light in weight if wall thicknesses are made small. For example I have built extremely strong members of an overall thickness of about $1\frac{3}{16}$" having substantially cubical projections about 1" high; longitudinal and transverse walls of a thickness of about $\frac{1}{16}$" containing 10–12 runs of 60-end glass roving plus an upright portion 57, 57a of a zig-zag glass-fiber strip 55, 55a; top and bottom walls 18, 20 about $\frac{1}{64}$" thick containing two of the crossing portions 58, 58a, 59, 59a of such strips; and die-draft angles of about 2½°. In such a member the glass will represent about 60% of the weight of the member. In other designs falling within the scope of the invention the glass can be made to represent about 40% or more of the weight of the structural member, practically double that produced in the practice disclosed in my application supra. These high glass contents evidence to those skilled in the art the high strength of structural members made in accordance with the invention.

The invention is not limited to a pattern in which the walls or wall segments of the structural member are of a height substantially equal to the width of the projections or the span of the cavities. While substantially cubical cavities have been exemplified the high strength provided thereby is not necessary in less critical uses. The invention comprehends patterns of any height with cavities of any shape that will provide continuous walls extending between opposed sides that can encapsulate the aforesaid continuous reinforcing elements 52.

Various changes and modifications will be apparent to those skilled in the art from the exemplary embodiments above described and fall within the scope of the appended claims.

I claim as my invention:

1. A multi-sided high-strength structural member including:

intersecting longitudinal and transverse upright walls of molded plastic material, said longitudinal walls having continuous portions of substantial height extending continuously between two opposed sides of said member, said transverse walls having continuous portions of substantial height extending continuously between other opposed sides of said member, each longitudinal wall comprising wall segments with their ends molded integrally in upright junction zones, each transverse wall comprising wall segments disposed end to end with their ends molded integrally with each other and with the ends of wall segments of the longitudinal walls at said upright junction zones, said longitudinal and transverse walls forming a uniform pattern of cavities arranged in crossing longitudinal and transverse rows, each cavity being bounded sidewardly by wall segments of said longitudinal and transverse walls, said upright walls extending between face planes of said structural member, at least one end of each cavity being open endwardly toward one of said face planes; and a series of elongated reinforcing elements within said continuous portion of each of said longitudinal and transverse walls encapsulated by the plastic thereof with reinforcing elements of each wall disposed one above the other in superimposed relation in runs at successive levels, each reinforcing element of each wall extending continuously between the corresponding opposed sides of said member through all of the junction zones and wall segments making up such wall, the reinforcing elements in intersecting walls crossing each other in alternating stacked relation within said junction zones with the reinforcing elements in one such intersecting wall extending between the runs of the reinforcing elements in the other intersecting wall.

2. A structural member as defined in claim 1 in which alternate of said longitudinal and transverse walls segments of each wall are coplanar with adjacent wall segments of each such wall oppositely and equally inclined at a small angle from a vertical plane perpendicular to the horizontal midplane of such member, all wall segments of such wall having their horizontal center lines aligned in a straight line representing the intersection of such planes, each such wall segment of such wall being of such thickness that said vertical plane lies therewithin for a substantial portion of the height of such wall segment to form said substantial-height continuous portion of such wall.

3. A structural member as defined in claim 2 in which the adjacent wall segments of each such wall are inclined at such angle and are of such thickness that said vertical plane lies within such wall segments at all positions from top to bottom thereof, the elongated reinforcing elements in each wall being superimposed one above the other to occupy substantially the complete height of each wall.

4. A structural member as defined in claim 1 in which each elongated reinforcing element comprises a plurality of long filaments, substantially all of such filaments in each reinforcing element being continuous between the corresponding opposed sides of said member and throughout all of the wall segments and junction zones of the corresponding wall.

5. A structural member as defined in claim 1 in which each elongated reinforcing element is a glass roving comprising a plurality of long glass filaments, substantially all of such glass filaments in each reinforcing element being continuous between the corresponding opposed sides of said member, the glass rovings of each wall being each of substantially uniform height and substantially uniform width between said junction zones but being flattened to be of lesser height and greater width within said junction zones at the cross-over points with the glass rovings of an intersecting wall.

6. A structural member as defined in claim 1 including additional reinforcements encapsulated in each wall segment extending at least partially across the runs of elongated reinforcing elements therein.

7. A structural member as defined in claim 1 in which alternate cavities of each row are closed at their bottoms by bottom walls of said plastic material molded integrally with the bottoms of the wall segments bounding such alternate cavities, the remaining cavities of each such row being closed at their tops by top walls of said plastic material molded integrally with the tops of the wall segments bounding such remaining cavities, and including additional reinforcements within said top and bottom walls separate from the stacked elongated reinforcing elements of said wall segments but extending at least partially thereacross.

8. A structural member as defined in claim 7 in which each elongated reinforcing element is a glass roving comprising a plurality of long glass filaments, and in which said additional reinforcements within said top and bottom walls comprise glass-fiber reinforcements extending at least partially across said stacked rovings.

9. A structural member as defined in claim 8 in which said glass-fiber reinforcement comprises a loose mass of randomly arranged glass fibers compressed in said top and bottom walls and in said wall segments.

10. A structural member as defined in claim 8 in which said cavities are four-sided, and in which said additional reinforcements comprise a first series of zig-zag strips extending respectively along said longitudinal rows of cavities, each strip having upright portions within the transverse wall segments bounding such cavities traversing the superimposed elongated reinforcing elements therein, top portions within the top walls and bottom portions within the bottom walls of such row, and a second series of said zig-zag strips extending respectively along the transverse rows of cavities having upright portions within the longitudinal wall segments bounding such cavities traversing the superimposed elongated reinforcing elements therein, top portions within the top walls of such row crossing the top portions of the strips of the first series, and bottom portions within the bottom walls of such row crossing the bottom portions of the strips of the first series.

11. A structural member as defined in claim 10 in which each elongated reinforcing element is a glass roving, and in which each strip of said first and second series is a strip of unidirectional glass mat with a majority of the glass fibers thereof extending lengthwise of the strip.

12. A structural member as defined in claim 1 in which the elongated reinforcing elements at the same level in adjacent longitudinal rows of walls are interconnected by loops encapsulated in the endmost wall segment joining such walls.

13. A structural member as defined in claim 1 in which the elongated reinforcing elements at the same level in all longitudinal walls are unitary and are formed of a long length of reinforcing material extending forwardly in one longitudinal wall, looping thence through the endmost wall segment at one side of the member joining this longitudinal wall with the next longitudinal wall, thence rearwardly in such next wall and looping through the endmost wall segment on the other side of the member joining such next wall with the next-beyond longitudinal wall, and thus repetitively for all of such longitudinal walls of said member.

14. A structural member as defined in claim 13 in which the elongated reinforcing elements in all transverse walls and which cross the aforesaid same-level reinforcing elements at an adjacent level are formed of the same long length of reinforcing material continuing forwardly through one transverse wall, then looping through an endmost wall segment at the opposite side of said member, thence rearwardly in the next transverse wall, then looping through an endmost wall segment joining such next transverse wall with the next-beyond transverse wall, and thus repetitively for all of the transverse walls of said element.

References Cited by the Examiner

UNITED STATES PATENTS

| | | | |
|---|---|---|---|
| 2,021,348 | 11/35 | Beckwith et al. | 154—45.9 |
| 2,122,479 | 7/38 | London | 161—84 |
| 2,335,208 | 11/43 | Harrap | 154—45.9 |
| 2,772,993 | 12/56 | Magnuson | 161—84 |
| 2,934,465 | 4/60 | Warp | 161—143 XR |
| 3,016,580 | 1/62 | Jaeschke | 18—59 |
| 3,074,116 | 1/62 | Green | 18—59 |
| 3,081,579 | 3/63 | Pelley | 161—143 XR |

ALEXANDER WYMAN, *Primary Examiner.*

MORRIS SUSSMAN, *Examiner.*